United States Patent
Jaramillo

(10) Patent No.: US 11,129,374 B2
(45) Date of Patent: Sep. 28, 2021

(54) FISHING REEL SPOOL TOOL KIT WITH SPOOLER AND DE-SPOOLER ASPECTS

(71) Applicant: Jose Jaramillo, Mineral Wells, TX (US)

(72) Inventor: Jose Jaramillo, Mineral Wells, TX (US)

(*) Notice: Subject to any disclaimer, the term of this patent is extended or adjusted under 35 U.S.C. 154(b) by 274 days.

(21) Appl. No.: 16/451,779

(22) Filed: Jun. 25, 2019

(65) Prior Publication Data

US 2019/0387727 A1    Dec. 26, 2019

Related U.S. Application Data

(60) Provisional application No. 62/690,064, filed on May 26, 2018.

(51) Int. Cl.
*A01K 89/01* (2006.01)
*A01K 89/015* (2006.01)
*A01K 89/00* (2006.01)
*A01K 97/06* (2006.01)

(52) U.S. Cl.
CPC ...... *A01K 89/01931* (2015.05); *A01K 89/003* (2013.01); *A01K 97/06* (2013.01)

(58) Field of Classification Search
CPC ............ A01K 89/003; A01K 89/01931; A01K 89/006; A01K 89/009; A01K 89/012; A01K 89/017; A01K 97/06
See application file for complete search history.

(56) References Cited

U.S. PATENT DOCUMENTS

| | | | | |
|---|---|---|---|---|
| 3,126,166 A | * | 3/1964 | Weinberg | A01K 89/006 242/250 |
| 4,196,864 A | * | 4/1980 | Cole | A01K 89/003 242/608.5 |
| 4,588,139 A | | 5/1986 | Lines | |
| 4,951,890 A | | 8/1990 | Sossamon | |
| 5,906,329 A | | 5/1999 | Wesley | |
| 6,015,111 A | * | 1/2000 | Berke | A01K 89/003 242/250 |
| 6,102,319 A | * | 8/2000 | Annabel | A01K 89/003 242/125.1 |
| 6,398,147 B1 | | 6/2002 | Fredrickson | |
| 6,606,839 B1 | * | 8/2003 | Suda | B65B 63/024 53/430 |
| 6,648,262 B1 | | 11/2003 | Huffman | |

(Continued)

*Primary Examiner* — Emmanuel M Marcelo
(74) *Attorney, Agent, or Firm* — Decker Jones, PC; Brian K. Yost

(57) ABSTRACT

A fishing reel de-spooler comprises a base member, a de-spooler drive shaft, and two or more extended members adapted to receive fishing line from a fishing reel. The de-spooler drive shaft is adapted for attachment to a chuck of a rotary drill and the plate member. The two or more extended members are removeably coupled to the plate member. The fishing reel spooler comprises an elongated plate member, a spooler drive shaft, and one or more handle receiving cup members adapted to receive a handle of a fishing reel. The elongated plate member is removeably coupled to the spooler drive shaft on a shaft side of the elongated plate member which is adapted to be coupled to the handle receiving cup members. The spooler drive shaft is adapted for attachment to a chuck of a rotary drill.

14 Claims, 5 Drawing Sheets

(56) References Cited

U.S. PATENT DOCUMENTS

| | | | | |
|---|---|---|---|---|
| 7,309,039 | B1* | 12/2007 | Stone | A01K 89/017 |
| | | | | 242/225 |
| 7,748,657 | B1 | 7/2010 | Goodman | |
| 8,827,198 | B1* | 9/2014 | Steadman, Sr. | B65H 75/14 |
| | | | | 242/608.4 |
| 9,066,504 | B2* | 6/2015 | Rutten | A01K 89/012 |
| 10,955,224 | B1* | 3/2021 | Theiss | F41H 13/0006 |
| 2008/0023580 | A1* | 1/2008 | Steeber | B65H 75/28 |
| | | | | 242/390.8 |
| 2009/0236459 | A1 | 9/2009 | McMann | |
| 2014/0263794 | A1* | 9/2014 | Bruno | A01K 89/003 |
| | | | | 242/323 |
| 2016/0088822 | A1* | 3/2016 | Masten | A01K 89/017 |
| | | | | 242/419.9 |

\* cited by examiner

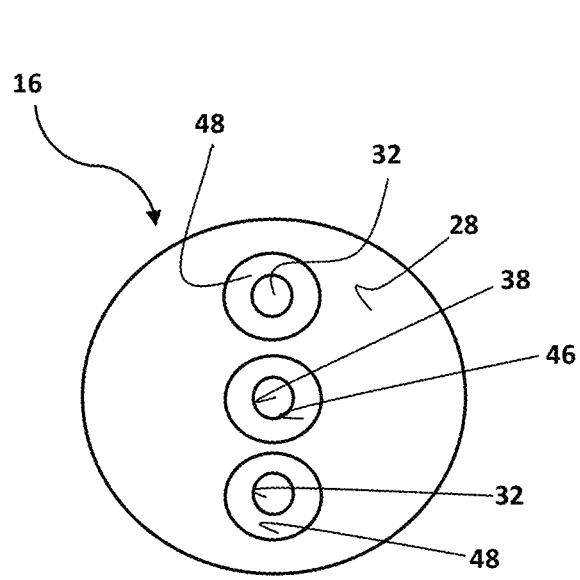
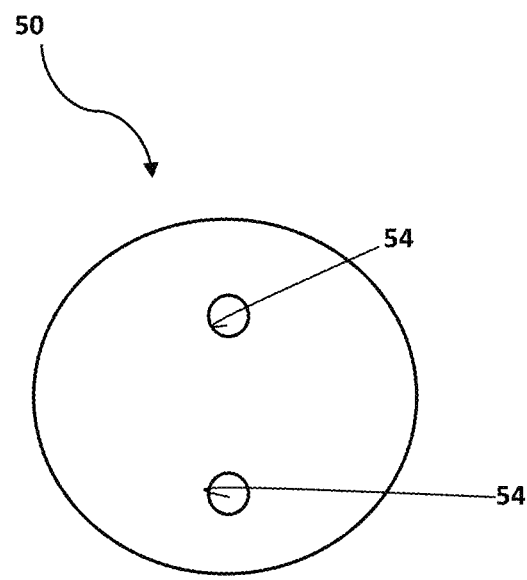
FIG. 1B  FIG. 1C

FISHING REEL SPOOL TOOL KIT WITH SPOOLER AND DE-SPOOLER ASPECTS

This application claims the benefit of provisional application Ser. No. 62/690,064 filed Jun. 26, 2018, the contents of which is incorporated by reference herein in its entirety.

BACKGROUND OF THE INVENTION

1. Field of the Invention

This disclosure relates generally to a fishing reel spool tool kit and specifically to a fishing reel spool tool kit with spooler and de-spooler aspects.

2. Description of the Prior Art

Anglers are often called upon to remove fishing line from a fishing reel or spool line onto a reel. Several devices are known in the art that help facilitate these tasks. For example, U.S. Pat. No. 4,196,864 to Cole discloses a toolset for replacing the fishing line wound around the spool of a fishing reel. U.S. Pat. No. 4,588,139, Lines discloses an apparatus for winding fishing line from a supply spool using a motor-driven reel rotor. U.S. Pat. No. 4,951,890, Sossamon, discloses a method and apparatus for winding fishing line onto a bottle using a drill. U.S. Pat. No. 5,906,329, Wesley provides a motor driven fishing reel winding device positioned within a housing. U.S. Pat. No. 6,102,319, Annebel provides fishing line winding tool that can be separated to permit the line to be removed. U.S. Pat. No. 6,398,147, Fredrickson and U.S. Pat. No. 6,015,111, Berke provide a tool that can be used to wind line. U.S. Pat. No. 6,648,262, Huffman provides a tool for unwinding fishing line. U.S. Pat. No. 7,748,657, Goodman provides a tool that can be fitted over the handle of a fishing reel that can be turned by a power drill. U.S. Pat. No. 9,066,504, Rutten provides a tool that can be attached to the handle of a fishing reel that can be turned by a power drill. U.S. Pat. Pub. No. 2009/0236459A1, McMann provides a device for winding material onto a spool.

What is needed is a fishing reel spooler and de-spooler adapted for use with a variety of different types of reels and which are readily collapsible such that they can be used and stored easily.

The device of the present disclosure provides a fishing reel spooler and de-spooler which either separately, or in combination, may be used with a variety of different types of reels, the devices each being portable, collapsible, and easily storable and which are adapted to be easily coupled to a conventional rotary drill.

SUMMARY OF THE INVENTION

There is provided a fishing reel spooler and de-spooler adapted to be coupled to an electric/power drill, the de-spooler comprising a base member, a drive shaft, and two extended members adapted to receive fishing line from a fishing reel, wherein one of the extended members can be loosened/collapsed to permit the line to be removed.

In some embodiments, the extended members are tapered and smooth.

In some embodiments, the extended members rest within respective recesses.

In some embodiments, the de-spooler is adapted for use as a spooler. In such embodiments, a conventional spool comprising openings may be threaded over the extended members and secured in position.

The spooler of the present disclosure comprises a base member, a drive shaft, and two cup members adapted to be fitted over a handle of a fishing reel, the width between the cup members being adjustable.

In some embodiments, the spooler comprises a single, elongated cup member adapted to be fitted over the handle of a fishing reel.

BRIEF DESCRIPTION OF THE DRAWINGS

FIG. 1B is a top side elevation view of the base member of the de-spooler of FIG. 1A.

FIG. 1C is a top side elevation view of the optional spool of the de-spooler of FIG. 1A.

DESCRIPTION OF PREFERRED EMBODIMENTS

Figure 1A:
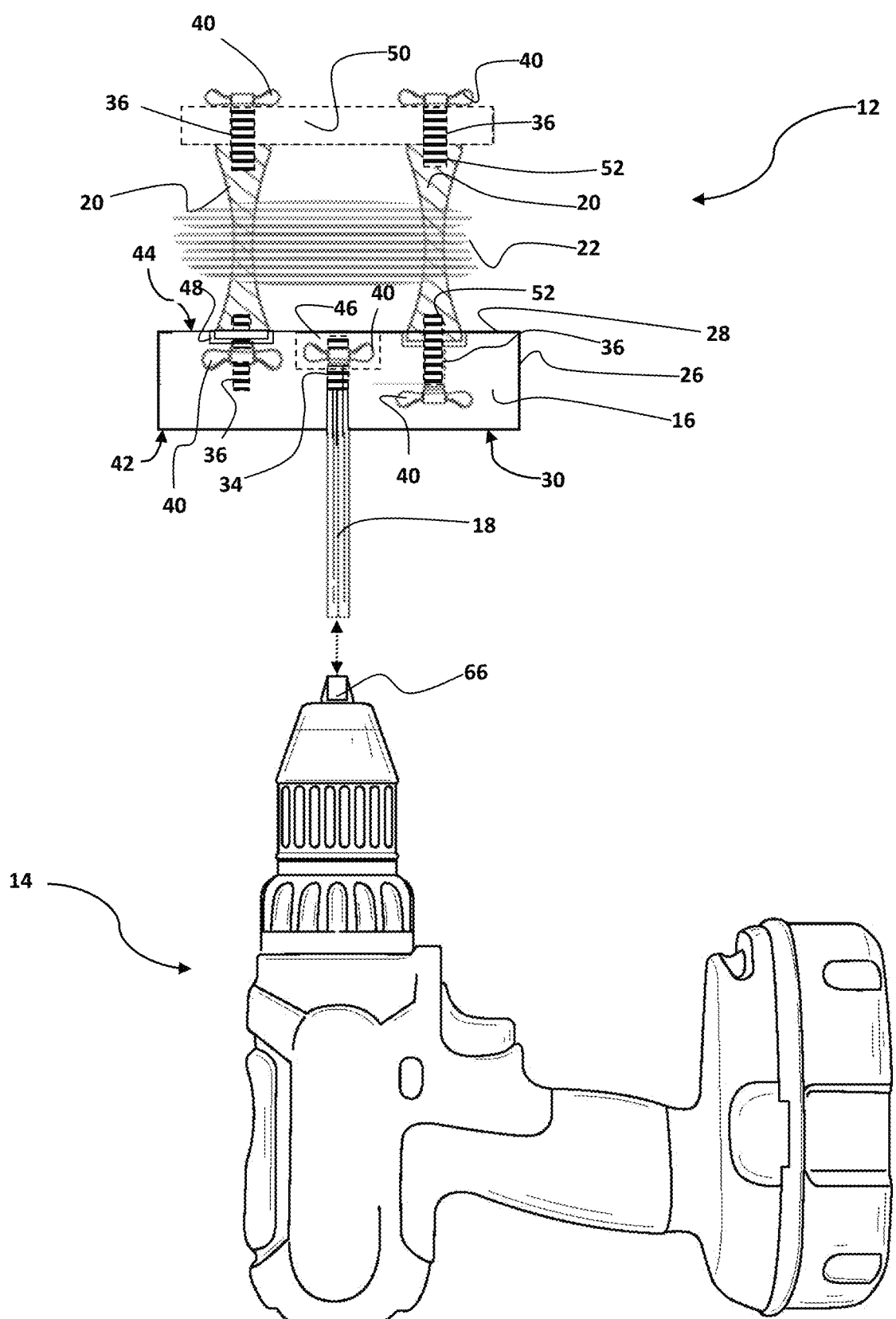
FIG. 1A is a side partial cutaway elevation view of a de-spooler of the fishing reel spool tool kit in accordance with a preferred embodiment.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In describing the embodiments of the invention, specific terminology will be used for the sake of clarity. However, the invention is not intended to be limited to the specific terms so selected, it being understood that each specific term includes all technical equivalents operating in a similar manner to accomplish a similar purpose. It is understood that the drawings are not drawn exactly to scale. In the drawings, similar reference numbers are used for designating similar elements throughout the several drawings.

This specification describes particular embodiments of the invention. However, it should be understood, based on this disclosure, that the invention is not limited to the embodiments detailed herein. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, aspects, adaptations, variations, alternatives, and uses of the invention, including what is presently believed to be the best mode of carrying out the invention.

Figure 2A:
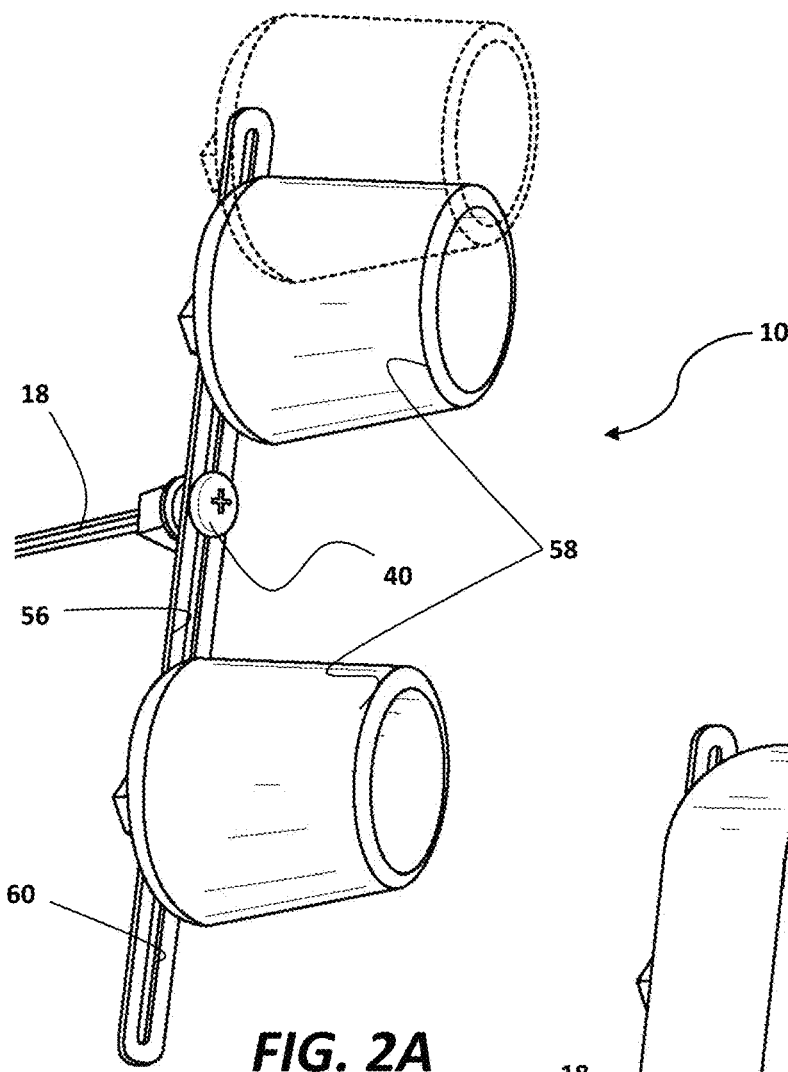
FIG. 2A is an isometric view of the spooler of the fishing reel spool tool kit in accordance with a preferred embodiment.
Figure 2B:
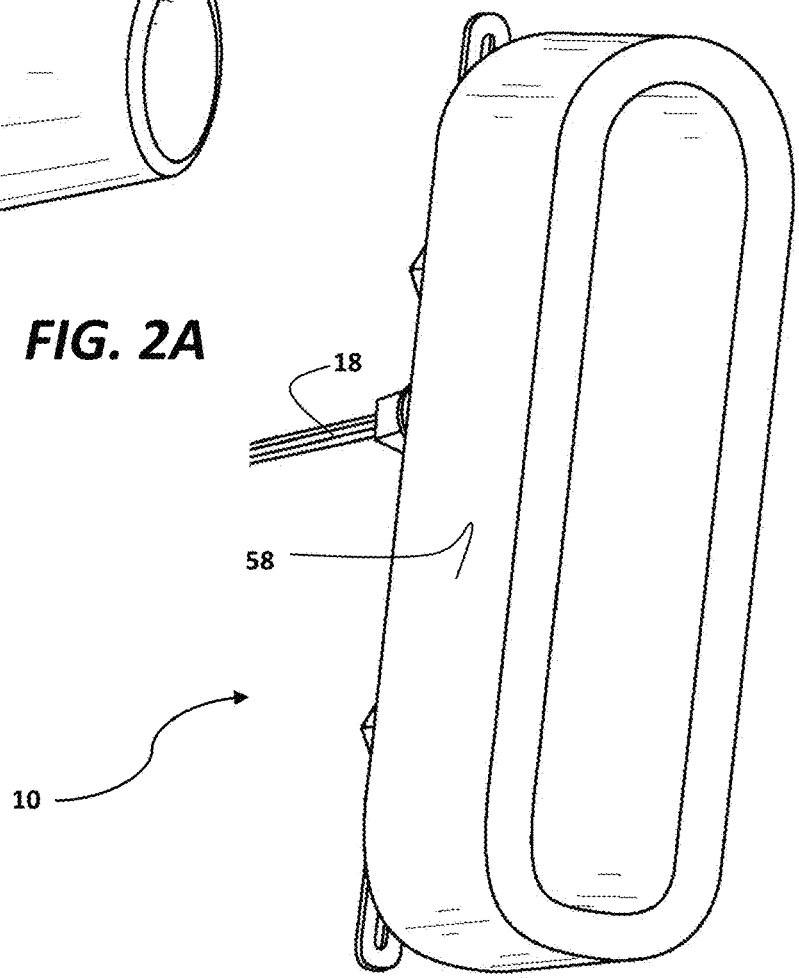
FIG. 2B is an isometric view of the spooler in accordance with another embodiment.
Figure 3A:
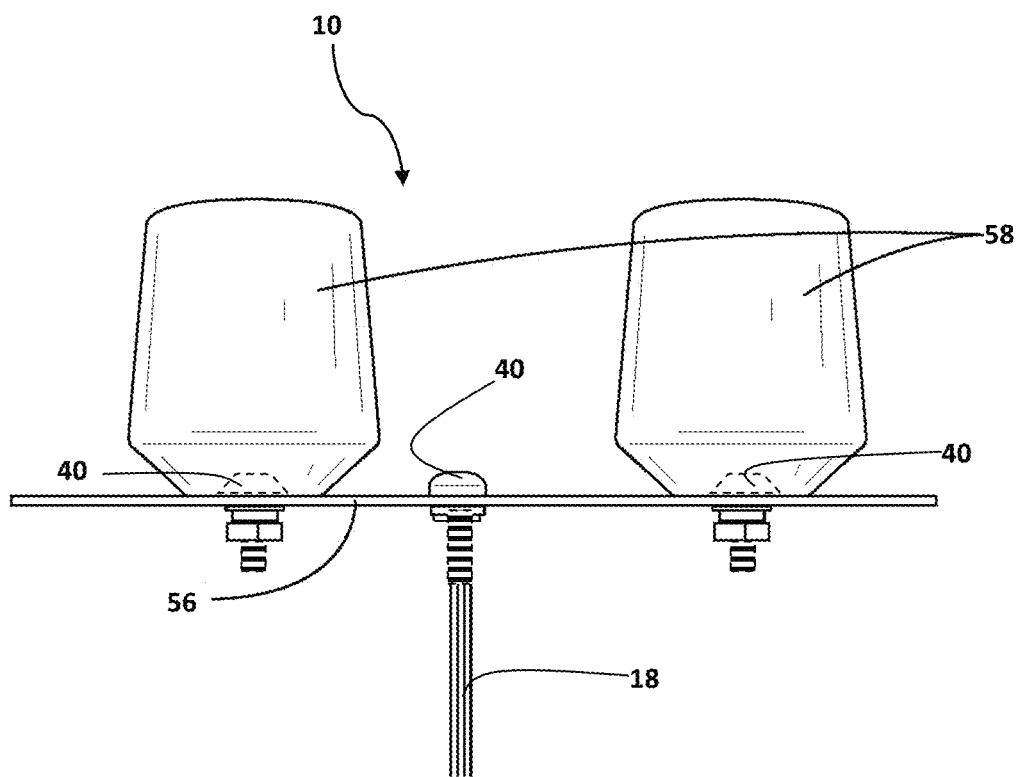
FIG. 3A is a side elevation view of the spooler of FIG. 2A.

Referring to the figures, there are provided a fishing reel spooler 10 (FIGS. 2A-3) and de-spooler 12 (FIGS. 1A-1C), each of which is adapted to be removably coupled to an electric/power drill 14.

De-Spooler

Referring to FIGS. 1A, 1B, and 1C, the de-spooler 12 of the preferred embodiment comprises a base member 16, a drive shaft 18, and two extended members 20 adapted to receive fishing line 22 from a fishing reel 24. The base member 16 of the preferred embodiment comprises a tubular configuration such that a circular outer wall 26 and plate member 28 define a cavity 30. The plate member 28 comprises lateral base member openings 32 through which respective threaded posts 36 may be inserted and secured in place by a fastener 40 such as wingnut 40. Although in the preferred embodiment, the base member 16 comprises a circular outside configuration when viewed from the top, the base member 16 may comprise virtually any outside configuration, including, but not limited to, a square, triangle, or rectangle. Because the base member 16 will be rotated, it is preferable, but not required, that the base member 16 generally comprise rotational symmetry along the axis of rotation.

The base member 16 comprises a shaft side 42 and a spool side 44, the base member 16 being adapted for removable coupling of the drive shaft 18. In the preferred embodiment, the drive shaft 18 is hexagonal towards one end so that it can easily be retained within a chuck 66 of a rotary drill 14 such as an electric drill 14. At a distal end, the drive shaft 18 comprises a threaded post 34 adapted to be inserted into a central base member opening 38. In the preferred embodiment, the central base member opening 38 is positioned within a central recess 46. This recess 46 permits the fastener 40 to sit below a horizontal plane defined by sides of the plate member 28. The base member 16 further comprises lateral recesses 48 surrounding the lateral base member openings 32.

The extended members 20 are adapted to be removably coupled to the base member 16. In the preferred embodiment, the extended members 20 are tapered such that they are narrower towards the position between respective ends. However, the extended members 20 need not be tapered. Rather, the extended members 20 can be of a constant diameter between the ends. The proximal ends of the extended members 20 nest within each lateral recess 48 when the extended members 20 are removably coupled to the base member 16. When the drive shaft 18 is fitted within the chuck 66 and the extended members 20 connected to the base member 16, the drive shaft 16 together with the base member 16 and extended members can be rotated. With this configuration, fishing line 22 from a fishing line source such as a fishing reel 24 or spool containing fishing line can be quickly de-spooled from the source and collected about the extended members 20 as is shown, for example, in FIG. 1A. In the preferred embodiment, one or both of the extended members 20 can be loosened/collapsed to permit the line 22 to be removed from the extended members 20. Thus, with this loosening, the extended members 20 move from a parallel position with respect to one another to a position wherein one or both the extended members 20 "lean" towards the other. With this configuration, the fishing line 22 becomes loosened so as to be easily removable from around the extended members 20.

In some embodiments, the extended members 20 may be connected to a fishing line spool 50. In such embodiments, the fishing spool may be removably coupled to a distal end of the respective extended members 20. At each end of each extended member 20 is an extended member opening 52 adapted to receive the threaded post 36. The fishing line spool 50 comprises fishing spool openings 54 adapted to receive the threaded post 36. Fasteners 40 may be used to secure each extended member 20 to the fishing line spool 50 and the base member 16. In this configuration, the de-spooler 12 may be used to spool line 22 onto the fishing line spool 50.

Spooler

Referring to FIGS. 2A-4, the spooler 10 of the preferred embodiment comprises a spooler plate 56, a drive shaft 18, and one or more cup members 58 adapted to be fitted over respective handle members 62 of a handle 64 of a fishing reel 24. In the preferred embodiment, the spooler plate 56 comprises a slot 60 which permits the width between two cup members 58 to be slidingly adjusted. The cup members 58 are removably coupled to the spooler plate 56 via the slot 60 with a conventional and commercially available fastener 40 arrangement. Referring to FIG. 2B, in some embodiments, the spooler 10 comprises a single cup member 58. With this arrangement, the cup member 58 is elongated and is adapted to receive both handle members 62 of a handle 64 of a conventional fishing reel 24.

Figure 3B:
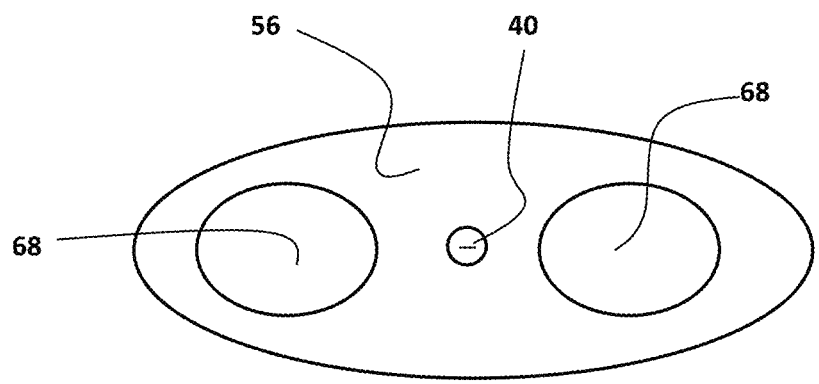
FIG. 3B is a top elevation view of the spooler in accordance with another embodiment.

Referring to FIG. 3B, in some embodiments, the spooler plate 56 comprises spooler plate openings 68 through which the handle members 62 may be inserted. In these embodiments, the spooler 10 does not comprise cup members 58. These spooler plate openings 68 can be of various diameters. In the preferred embodiment, the spooler plate openings 68 are elongated so as to accept the handle members 62 of various conventional reels 24.

Figure 4:
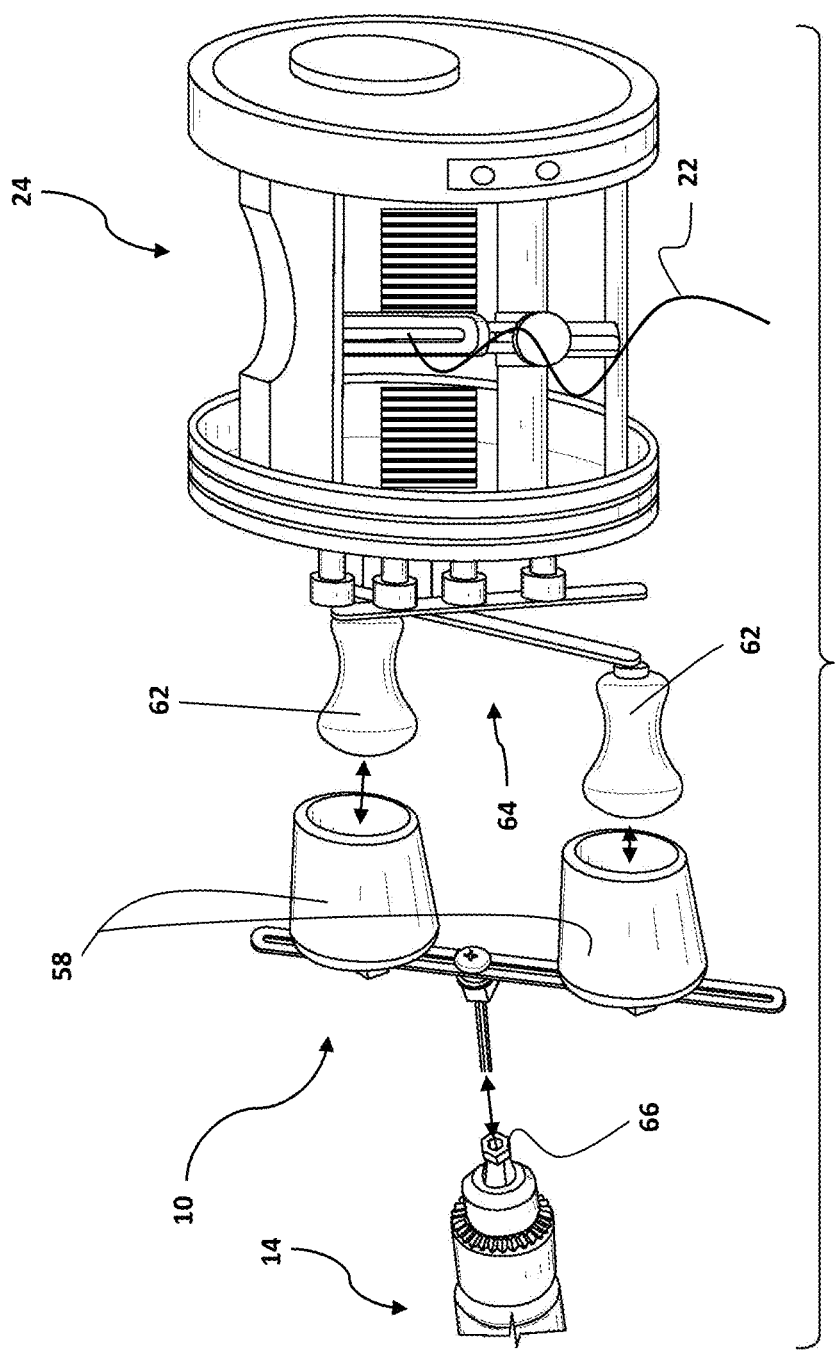
FIG. 4 is an isometric exploded view of the spooler of FIG. 2A as it would be removably coupled to a conventional fishing reel, in accordance with a preferred embodiment.

In use, referring to FIG. 4, after assembling the spooler 10 as described, the spooler shaft 18 is inserted within the chuck 66 of the rotary drill 14. The handle members 62 are positioned within the respective cups 58 and the drill 14 is activated so as to rotate the handle 64 in the desired direction to spool line onto the reel 24.

In the preferred embodiment, the spooler 10 and de-spooler 12 are provided as a kit 10, 12. A user can easily disassemble the component parts described in this disclosure and store the disassembled elements in a drawer, tackle box, or other storage space. When the user desires to either spool or de-spool line 22, the user can readily assemble the components and attach the desired spooler 10 or de-spooler 12 to a conventional rotary drill 14 to accomplish the desired task.

In the preferred embodiment, various components are formed from metal. However, any suitable material known in the art may be used. For example, the cup members 58 may be formed from plastic or rubber. Although in the preferred embodiment, the base member comprises a central recess 46 and lateral recesses 48, the base member 16 need not comprise such recesses 46, 48. Rather, the fasteners 40 can be arranged so as to be positioned flush with plate member 28.

Although in the preferred embodiments, the separate components are removably coupled to adjacent structures, in some embodiments, the shaft 18 is fixed to the base member 16, and, with respect to the spooler 10, the spooler plate 56, and not readily removable. In some embodiments, the cup members 58 are fixed in a set position and not readily removable from the spooler plate 56. In some embodiments, the spooler plate 56 slot 60 is enlarged in certain places such that it is adapted to receive the handle members 62 of a fishing reel 24. Thus, the slot 60 may be narrow towards the center and wider towards the ends such that it generally comprises a FIG. 8 outside configuration.

The foregoing disclosure and showings made in the drawing are merely illustrative of the principles of this invention and are not to be interpreted in a limiting sense. While the invention is shown in only a few forms, it is not just limited to the forms shown, but is susceptible to various changes and modifications without departing from the spirit thereof. The foregoing description of a preferred embodiment of the invention has been presented for the purpose of illustration and description. It is not intended to be exhaustive or to limit the invention to the precise form disclosed. Obvious modifications or variations are possible in light of the above teachings. The invention may be adapted for use in a number of environments.

The embodiments were chosen and described to provide the best illustrations of the principles of the invention and its practical application, and to enable one of ordinary skill in the art to utilize the invention in various embodiments and with various modifications as are suited to the particular use contemplated. All such modifications and variations are within the scope of the invention in accordance with the breadth of this disclosure, to which it is fairly, legally, and equitably entitled to be interpreted.

I claim:

1. A fishing reel de-spooler comprising:
   a base member, a drive shaft, and two or more extended members;
   the base member comprising a perimeter wall and a plate member, the plate member defining an end wall of the base member such that the perimeter wall and plate member define a cavity;
   the plate member comprising a spool side and a shaft side of the base member, the cavity being adjacent to the spool side;
   the drive shaft comprising first and second ends, the first end being adapted for attachment to a chuck of a rotary drill;
   the drive shaft second end being removably coupled to the shaft side of the plate member such that, when in an assembled position, the drive shaft generally extends from a plate member central position; and
   the two or more extended members each comprising first and second ends, the extended member first ends being removably coupled to the spool side of the plate member such that, when in assembled positions, each extended member extends from the plate member such that the two or more extended members are adapted, in such positions, to receive fishing line from a fishing reel.

2. The fishing reel de-spooler of claim 1, wherein the plate member comprises a recessed portion, the drive shaft being coupled to said recessed portion.

3. The fishing reel de-spooler of claim 1, wherein at least one of the two or more extended members comprises a central diameter and a first end diameter, the central diameter being shorter than the first end diameter such that the at least one of the extended members comprises a tapered configuration.

4. The fishing reel de-spooler of claim 1, wherein at least one of the two or more extended members comprises a central diameter and a second end diameter, the central diameter being shorter than the second end diameter such that the at least one of extended members comprises a tapered configuration.

5. The fishing reel de-spooler of claim 1, further comprising a fishing line spool adapted to receive fishing line.

6. The fishing reel de-spooler of claim 5, the fishing line spool being removably coupled to one or more of the extended members.

7. A fishing reel spooler comprising;
   an elongated plate member, a drive shaft, and one or more handle receiving cup members;
   the handle receiving cup members each being adapted to receive a handle member of a fishing reel;
   the elongated plate member being structured and arranged to be coupled to the drive shaft on a shaft side of the elongated plate member;
   the elongated plate member being further structured and arranged to be coupled to the one or more handle receiving cup members on a cup member side of the elongated plate, the cup member side being opposite the drive shaft side, at least one of the receiving cup members being slidingly coupled to the elongated plate member;
   the drive shaft comprising first and second ends, the first end being adapted for attachment to a chuck of a rotary drill; and
   the drive shaft second end being removably coupled to the shaft side of the elongated plate member such that, when in an assembled position, the drive shaft generally extends from an elongated plate member central position.

8. In combination, a fishing reel de-spooler and a fishing reel spooler kit comprising:
   a fishing reel de-spooler and a fishing reel spooler;
   wherein the fishing reel de-spooler comprises:
   a base member, a de-spooler drive shaft, and two or more extended members;
   the base member comprising a perimeter wall and a plate member, the plate member defining an end wall of the base member such that the perimeter wall and plate member define a cavity;
   the plate member comprising a spool side and a shaft side of the base member, the cavity being adjacent to the spool side;
   the de-spooler drive shaft comprising first and second ends, the de-spooler drive shaft first end being adapted for attachment to a chuck of a rotary drill;
   the de-spooler drive shaft second end being removably coupled to the shaft side of the plate member such that, when in an assembled position, the de-spooler drive shaft generally extends from a plate member central position; and
   the two or more extended members each comprising first and second ends, the extended member first ends being removably coupled to the spool side of the plate member such that, when in assembled positions, each extended member extends from the plate member such that the two or more extended members are adapted, in such positions, to receive fishing line from a fishing reel;

wherein the fishing reel spooler comprises:

an elongated plate member, a spooler drive shaft, and one or more handle receiving cup members;

the handle receiving cup members each being adapted to receive a handle member of a fishing reel;

the elongated plate member being structured and arranged to be removably coupled to the spooler drive shaft on a shaft side of the elongated plate member;

the elongated plate member being further structured and arranged to be coupled to the one or more handle receiving cup members on a cup member side of the elongated plate, the cup member side being opposite the elongated plate member shaft side;

the spooler drive shaft comprising spooler drive shaft first and second ends, the spooler drive shaft first end being adapted for attachment to a chuck of a rotary drill; and the spooler drive shaft second end being removably coupled to the shaft side of the elongated plate member such that, when in an assembled position, the spooler drive shaft generally extends from an elongated plate member central position.

9. The fishing reel de-spooler and a fishing reel spooler kit of claim 8, wherein the plate member comprises a recessed portion, the de-spooler drive shaft being coupled to said recessed portion.

10. The fishing reel de-spooler and a fishing reel spooler kit of claim 8, wherein at least one of the two or more extended members comprises a central diameter and a first end diameter, the central diameter being shorter than the first end diameter such that the at least one of the extended members comprises a tapered configuration.

11. The fishing reel de-spooler and a fishing reel spooler kit of claim 8, wherein at least one of the two or more extended members comprises a central diameter and a second end diameter, the central diameter being shorter than the second end diameter such that the at least one of extended members comprises a tapered configuration.

12. The fishing reel de-spooler and a fishing reel spooler kit of claim 8, the de-spooler further comprising a fishing line spool adapted to receive fishing line.

13. The fishing reel de-spooler and a fishing reel spooler kit of claim 12, the fishing line spool being removably coupled to one or more of the extended members.

14. The fishing reel de-spooler and a fishing reel spooler kit of claim 8, wherein at least one of the receiving cup members is slidingly coupled to the elongated plate member.

* * * * *